United States Patent [19]

Grossman

[11] Patent Number: 4,952,634

[45] Date of Patent: Aug. 28, 1990

[54] CURABLE CARBOXYLATED POLYMERS CONTAINING POLYMERIC POLYVALENT METAL SALT CROSSLINKING AGENTS

[75] Inventor: Richard F. Grossman, Shelton, Conn.

[73] Assignee: Synthetic Products Company, Cleveland, Ohio

[21] Appl. No.: 231,661

[22] Filed: Aug. 12, 1988

Related U.S. Application Data

[63] Continuation of Ser. No. 5,600, Jan. 21, 1987, abandoned.

[51] Int. Cl.⁵ .................. C08L 13/00; C08L 87/00
[52] U.S. Cl. .................. 525/190; 525/329.3; 525/366; 525/370; 525/418
[58] Field of Search ............ 525/190, 365, 366, 370, 525/418

[56] References Cited

U.S. PATENT DOCUMENTS

| | | | |
|---|---|---|---|
| 2,662,874 | 12/1953 | Brown | 525/373 |
| 2,669,550 | 2/1954 | Brown | 525/372 |
| 2,671,074 | 3/1954 | Brown | 525/373 |
| 2,849,426 | 8/1958 | Miller | 525/373 |
| 3,248,360 | 4/1966 | Hallenbeck | 525/329.3 |
| 3,258,448 | 6/1966 | Hallenbeck | 525/329.3 |
| 3,403,136 | 9/1968 | Baker, Jr. | 525/373 |
| 4,362,837 | 12/1982 | Teyssie | 524/400 |
| 4,415,690 | 11/1983 | Grimm | 524/112 |
| 4,525,517 | 6/1985 | Sato | 524/394 |

*Primary Examiner*—Christopher Henderson
*Attorney, Agent, or Firm*—Wood, Herron & Evans

[57] ABSTRACT

Curable carboxylated compositions are disclosed containing as a crosslinking agent a linear polymeric hindered polyvalent salt of an aromatic polycarboxylic acid. The salt is heat stable at crosslinking temperatures of the curable composition. Polyvalent metals include calcium, magnesium, cadmium, zinc, lead, cobalt, strontium, barium, nickel, copper, tin, aluminum, cerium, indium, iron, and chromium ions. Aromatic polycarboxylic acids of the salt include terephthalic, trimellitic, pyromellitic and trimesic.

13 Claims, No Drawings

CURABLE CARBOXYLATED POLYMERS CONTAINING POLYMERIC POLYVALENT METAL SALT CROSSLINKING AGENTS

This application is a continuation, of application Ser. No. 005,600, filed Jan. 21, 1987, now abandoned.

Background of the Invention

Curable polymers containing pendent carboxylic acid groups are well known in the art. These polymers are commonly referred to as carboxyl-containing or carboxylated polymers. Reference is made for instance to U.S. Pat. Nos. 2,662,874; 2,669,550; 2,671,074; 2,849,426; 3,403,136; 3,248,360 and 4,525,517 wherein the polyvalent metal oxide cure of various carboxyl-containing plastic and elastomeric polymers is disclosed. It is also well known that the reaction between a polyvalent metallic cation and an acid group of the carboxylated polymer is rapid and vigorous compared to, for example, sulfur vulcanization of rubbers. The metal oxide may be used alone or in combination with sulfur and in this latter case, the metal oxide is usually referred to as an activator. Vulcanization or curing by the metal oxide occurs with the formation of ionic crosslinks resulting from the condensation reaction whereby compositions may gradually or suddenly become tough and unworkable during compounding or even while standing at room temperatures. Premature curing is usually referred to as scorch and it is a significant problem.

The problem of scorch is exemplified by crosslinking of carboxylated nitrile rubber. Nitrile rubber (NBR) is a copolymer of butadiene and acrylonitrile of commercial importance because of its resistance to oil solvents of a much higher level than natural rubber or general purpose synthetic rubbers such as styrene-butadiene (SBR) or ethylene-propylenebutadiene terpolymer (EPDM). For instance, in certain grades of carboxylated nitrile rubber (XNBR), minor amounts of unsaturated acids, such as acrylic acid, are added during polymerization yielding a terpolymer with pended carboxylic acid groups. Almost all commercial use of XNBR depends on special properties conferred by the crosslinking reaction with zinc oxide. In most cases, the reaction of XNBR with zinc oxide is too rapid. It proceeds to some extent at room temperature, leading to premature crosslinking and short shelf life. Even after brief storage, there is sufficient reaction to induce premature crosslinking during processing of the unvulcanized compound. When zinc oxide is used, it is necessary to add this ingredient in a separate step just prior to fabrication of the elastomeric article. A known remedy for scorching or premature crosslinking is to replace zinc oxide with zinc peroxide. For instance, U.S. Pat. No. 3,403,136 is directed to the inclusion of a polyvalent metal crosslinking agent in the form of peroxide to retard a crosslinking reaction. Zinc peroxide as a replacement for zinc oxide over the temperatures of about 140°–190° C. decomposes thermally at a controlled rate to yield zinc oxide and processing is not impeded by vulcanization. Other prior art attempts have been made to reduce premature curing or scorching as exemplified by U.S. Pat. No. 3,248,360 which involves coating polyvalent metal with a phosphate; or U.S. Pat. No. 3,258,448 which involves coating the polyvalent metal compound with a sulfide or mercaptide; or U.S. Pat. No. 3,178,389 which teaches the use of polyvalent metal alcoholate; or U.S. Pat. No. 4,415,690 which teaches the use of an alkyl or alkenyl derivative of a succinic acid or anhydride. More recently, U.S. Pat. No. 4,525,517 is directed to the inclusion of alkali metal salts of alkanoic acids in order to improve scorch of carboxylated nitrile rubber.

While zinc peroxide has been a commercially desirable crosslinking agent which reduces the problem of premature crosslinking or scorch, zinc peroxide is a strong oxidizer and a flammable solid. If zinc peroxide is directly added to XNBR compounds either on a two roll mill or in an internal mixer, there is a considerable likelihood of ignition and fire. Therefore, it is always used in predispersed form, either as a paste in a suitable plasticizer or as a dispersion in NBR made from such a paste. Unfortunately, such dispersions have also ignited during their manufacture.

In view of the above brief summary of the state of the art with respect to curable carboxylated polymers or elastomers and crosslinking agents, it is evident that there is a need for further improvements.

SUMMARY OF THE INVENTION

This invention is directed to curable carboxylated polymer compositions comprising a curable carboxylated polymer and, as a crosslinking agent, a substantially linear polymeric hindered polyvalent metal salt of an aromatic polycarboxylic acid. The substantially linear polymeric hindered polyvalent metal salt is referred to hereinafter sometimes more simply as "polymeric hindered metal salt(s)". The polymeric hindered polyvalent metal salt has heat stability and does not decompose to the polyvalent metal oxide at crosslinking temperatures. Thus, it has been found that such hindered polyvalent metal salts of aromatic polycarboxylic acids may be employed to fully cure carboxylated polymers. The polymeric salts are not oxidizers and, thus, pose no ignition hazard in contrast to the problem associated with zinc peroxide. Surprisingly, controlled full cures are obtained with the polymeric hindered metal salts and process safety is not sacrificed.

A preferred class of carboxylated elastomers for use in accordance with the principles of this invention are carboxylated nitrile rubbers. As mentioned above, the carboxylated nitrile rubbers are copolymers of butadiene and acrylonitrile containing minor amounts of acrylic or other unsaturated acids to provide a terpolymer generally known as carboxylated nitrile rubber. Employing such curable elastomers, the polymeric hindered metal salts of this invention are normally employed in an amount of from about 3 to about 10 parts per 100 parts of curable polymer or elastomer, usually on the order of about 5 parts per 100 parts. The polymeric hindered and heat stable polyvalent metal salts of aromatic polycarboxylic acids preferably include divalent calcium, magnesium, cadmium, zinc, lead, cobalt, strontium, barium, nickel, copper and tin ions; and the trivalent aluminum, cerium, indium, iron and chromium ions. The polycarboxylic aromatic acid proven to be useful with the mentioned cations include terephthalic, trimellitic, pyromellitic and trimesic. It has been found that these polymeric hindered metal salts tend to eliminate scorch and provide a controlled cure or time delay over pure zinc oxide, for instance. Furthermore, these polymeric hindered metal salts also provide process safety in contrast to other salts such as zinc peroxide.

The activities of the polymeric hindered polyvalent metal salts of this invention are considered very advantageous and differentiable over other polyvalent metal salts or oxides. By comparison, as developed hereinafter, polyvalent metal salts of benzoic, phthalic, isophthalic and similar acids as set forth in the detailed description of this invention, along with aliphatic acids, do not provide the benefits of this invention in that they either provide no controlled cure or time delay over pure zinc oxide, or they may even be less safe than zinc oxide. Thus, this invention is predicated in part upon the discovery of a class of polymeric hindered and heat stable polyvalent metal salts of aromatic polycarboxylic acids which are stable at crosslinking temperatures to effectively crosslink carboxylated polymers of the carboxylated nitrile rubber type. Such polymeric hindered metal salts provide commercially useful rates of crosslinking, substantial shelf stability and retard the onset of crosslinking so as to provide scorch safety.

Further details of this invention and its operating parameters, along with the benefits and advantages secured thereby, may be understood with reference to the following detailed description.

DETAILED DESCRIPTION

I. Carboxylated Polymers Generally

The carboxylated polymers suitable for use in accordance with the principles of this invention have been well developed in the art. As mentioned in the background of this invention, U.S. Pat. Nos. 2,662,874; 2,669,550; 2,671,074; 2,849,426; 3,403,136; 3,248,360 and 4,525,517 are directed to such carboxylated elastomers or polymers which may be cured by the reaction of the polyvalent metal salt of this invention to form metallocarboxylate elastomeric polymers. In view of the heat stability of the hindered polyvalent metal salts at crosslinking temperatures, the reaction of a metal salt with the free carboxylic acid groups on the polymer backbone takes place.

The plastic carboxyl-containing polymers useful in this invention include those resulting from the interpolymerization of one or more carboxylic monomers with one or more other monomers copolymerizable therewith, the polymerization of monomers having groups which are hydrolyzable to carboxyl groups or those resulting from the reaction of a carboxylating agent or carboxyl supplying reagent with a plastic or rubbery polymer which does not contain carboxyl groups.

Carboxylic interpolymers embodied herein are those resulting from the polymerization of a minor amount of carboxyl-containing monomer with a major amount of one or more other monomers copolymerizable therewith. The olefinically unsaturated carboxylic acids are preferred as carboxylic-containing monomers and the monomers copolymerizable therewith include conjugated dienes, acrylate esters, methacrylate esters, vinyl esters, monoolefins, vinyl cyanides, vinyl aromatic compounds, vinyl halides, vinyl ethers, maleate esters, fumarate esters, and the like.

The olefinically unsaturated carboxylic acids which are interpolymerized to give carboxyl polymers embodied herein are characterized as possessing one or more olefinic carbon-to-carbon double bonds and one or more carboxyl groups, that is, monocarboxy and polycarboxy, monoolefinic and polyolefinic acids including, for example, such widely divergent materials as acrylic acid, the alpha-alkyl acrylic acids, crotonic acid, beta acryloxy propionic acid, alpha- and beta-vinyl acrylic acid, alpha, beta-diisopropylidene propionic acid, sorbic acid, cinnamic acid, maleic acid, oleic acid, undecylenic acid, ricinoleic acid, linoleic acid, linolenic acid and others. Better results are obtained by utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly —CH=CH —COOH or attached to a terminal methylene grouping thusly $CH_2=C$.

Illustrative alpha-beta unsaturated carboxylic acids within the above-described preferred class include maleic acid, fumaric acid, itaconic acid, citraconic acid, mesaconic acid, crotonic acid, alpha-butyl crotonic acid, angelic acid, hydrosorbic acid, cinnamic acid, m-chloro cinnamic acid, p-chloro cinnamic acid, umbellic acid, betabenzal acrylic acid, and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon-dimethyl sorbic acid, alpha-methyl-gamma-benzal crotonic acid, beta-(2-butene)acrylic acid, 2,4-pentadienoic acid, 2,4,6-octarienoic acid, 2,4,6,8-decatrienoic acid, 1-carboxyl-1-ethyl-4-phenyl butadiene-1,3,2,6-dimethyl decatriene-(2,6,8)-oic 10 acid, alpha, beta-diisopropylidene propionic acid, alpha vinyl cinnamic acid, alpha-isopropenyl-furfural acetic acid, alpha-isopropenyl-cinnamyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C$ grouping include acrylic acid, alpha-chloro acrylic acid, methacrylic acid, ethacrylic acid, alpha-isopropylidene acrylic acid, alpha-styryl acrylic acid, beta vinyl acrylic acid, alpha-vinyl acrylic acid, beta-acryloxy acetic acid, and others.

Monomers copolymerizable with the foregoing carboxylic monomers which are useful in the interpolymers embodied herein include the open chain, aliphatic conjugated dienes including the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologues of butadiene-1,3 and in addition the substituted dienes such as 2-chloro butadiene-1,3, 2-cyano butadiene-1,3, the straight—and branched-chain conjugated hexadienes and others. The butadiene-1,3 hydrocarbons and butadiene-1,3 in particular, because of their ability to produce stronger and more desirable polymers are much preferred.

Also included as monomers copolymerizable with the foregoing carboxylic monomer in the formation of carboxyl-containing plastic and rubbery polymers embodied herein are monoolefinic monomers including acrylate esters such as methyl acrylate, ethyl acrylate, the propyl acrylates, the butyl acrylates, the amyl acrylates, the hexyl acrylates and acrylate esters in general wherein the alcohol moiety is composed of a hydrocarbon ggroup having from 1 to 18 carbon atoms; the methacrylate esters such as methyl methacrylate, ethyl methacrylate, cyclohexyl methacrylate, phenyl methacrylate and methacrylate esters in general wherein the alcohol moiety is composed of a hydrocarbon group having from 1 to 18 carbon atoms; the vinyl halides such as vinyl chloride, vinyl bromide, vinyl fluoride, vinyl iodide, vinylidene chloride, tetrafluoro ethylene, chloro trifluoro ethylene, and the like; the vinyl cyanides such as acrylonitrile, methacrylonitrile, vinylidene cyanide, alpha-cyano ethyl acrylate, maleic nitrile and the like; the vinyl aromatic monomers such as styrene, alpha-methyl styrene, the vinyl toluenes, the vinyl xylenes, vinyl biphenyl, vinyl naphthalene and the lke; the allyl esters such as allyl acetate, allyl butyrate, methallyl acetate and the like; the vinyl esters such as vinyl acetate, vinyl propionate, vinyl butyrate, vinyl stearate, vinyl benzoate, isopropenyl acetate, isopropenyl laurate, and the like; the vinyl ethers such as vinyl methyl ether, vinyl ethyl ether, vinyl-2-ethyl hexyl ether and the like; vinyl pyridine, isobutylene, ethylene, propylene and the like; the allyl ethers such as methyl allyl ether, ethyl methallyl ether, and others.

Carboxyl-containing polymers disclosed in U.S. Pat. Nos. 2,649,439; 2,662,874; 2,724,707 and 2,849,426 are useful in the instant invention and the disclosures of these patents and other patents mentioned above are incorporated herein by reference. The polymers containing from 0.001 to 0.30 chemical equivalents of (—COOH) per 100 parts of polymers (e.p.h.p.) are predominantly plastic in nature and are adapted to produce rubbery elastic compositions when condensed with the hindered polyvalent metallic salt. Polymers containing from 0.02 to 0.20 e.p.h.p. of carboxyl are preferred for the production of elastomeric metallo-carboxylates having the best balance of properties while those containing from 0.02 to 0.10 e.p.h.p. of carboxyl are preferred for the production of strong elastic compositions having most excellent low temperature flexibility.

II. Carboxylated Nitrile Rubber

The carboxylated nitrile rubber that is preferably used in the present invention may be any of those known in the art. These are copolymers of butadiene, acrylonitrile and one or more $\alpha,\mu$-unsaturated carboxylic acids mentioned above. The carboxylic acids may contain one or more carboxylic groups. Because of cost and availability, it is preferred that the carboxylic acids be selected from acrylic, methacrylic, fumaric, maleic and itaconic acids. The copolymers may be prepared by the well known emulsion free radical process. The acrylonitrile content of the copolymer may be from about 20 to about 40 percent by weight of the copolymer. The total content of carboxylic acid in the copolymer may be from about 0.5 to a about 10 percent by weight of the copolymer. Butadiene forms the balance to 100 percent by weight of the copolymer. The viscosity of the copolymer is generally within the Mooney range (ML 1+4 at 100° C.) of from about 40 to about 80. U.S. Pat. Nos. 4,271,052 and 4,525,517 disclose carboxylated nitrile rubbers for use in this invention and such disclosures are incorporated herein by reference.

III. Substantially Linear Polymeric Hindered Polyvalent Metal Salts of Aromatic Polycarboxylic Acids The polymeric hindered polyvalent metal salts are divalent, trivalent or higher valent metal salts of aromatic polycarboxylic acids exemplified by terephthalic, trimellitic, pyromellitic and trimesic acids. The metal cations of these salts include divalent calcium, magnesium, cadmium, zinc, lead, cobalt, strontium, barium, nickel, copper and tin ions; and the trivalent aluminum, cerium, indium, iron and chromium ions. Polyfunctional aromatic polycarboxylic acids useful in accordance with the principles of this invention may be exemplified by the aromatic nucleus of benzene, naphthalene, anthracene or the like. The essential criteria for the polymeric hindered polyvalent metal salts of this invention are the polymeric hindered nature of the polyvalent metal ion of the aromatic polycarboxlic acid and the thermal stability of the salt at cross-linking temperatures. Thus, it will be understood that while a number of polymeric hindered salts have been actually exemplified hereinafter in the operating examples, others may be used to accomplish the purposes of this invention. It is believed that the salts exist as substantially linear polymers in this hindered form with the equivalence of the oxygens bonded to the metal ion. Thus, the terms substantially linear polymeric hindered polyvalent metal salt have been adopted to define this general class of crosslinking agents used according to the broader aspects of the compositions and methods of this invention. This will be discussed in more detail hereinafter with reference to the Examples.

The following examples illustrate the practice of this invention and a number of its parameters. In comparison, other variations including prior art compositions are demonstrated so that the advantages and results achieved according to the principles of this invention may be appreciated.

EXAMPLE 1

In order to demonstrate the curing effect of zinc oxide upon a carboxylated polymer such as a carboxylated nitrile rubber, the following base composition was mixed and processed using a Farrel Midget Banbury. Krynac 221 (a general purpose carboxylated nitrile rubber of Polysar Ltd. which is believed to contain by weight about 7% carboxylated monomer, about 28% acrylonitrile and about 65% butadiene) was mixed on a parts by weight basis at 100 parts with 1 part stearic acid, 50 parts carbon black (N660), 5 parts di-2-ethylhexyl phthalate plasticizer, 1.5 parts sulfur and 1.5 parts tetramethylthiuram monosulfide accelerator. After cooling the mixed base composition to room temperature, 5 parts zinc oxide were added on a cool lab two roll mill. The process safety of this composition was tested on a Monsanto Oscillating Disc Rheometer at 165° C. with an oscillation cycle of 100 cycles/minute of 1 degree arc. In this test the resistance to oscillation of the disc offered by the rubber sample is plotted versus time at the indicated temperature. Crosslinking causes a dramatic increase in this resistance. When the composition of this example was tested it showed an onset of crosslinking after about 0.6 minute at 165° C. (i.e., scorch safety value). This is insufficient for most processes, for example, because it would not provide sufficient time for the composition to flow to its desired shape before vulcanization ensued. After standing for one week at room temperature, the scorch safety value for this compound had decreased to about 0.3 minute according to the same test. Within 30 days, the composition of this example could not be processed on a two roll mill because it had cured upon standing at room temperature.

EXAMPLE 2

For comparison with Example 1, the same base composition was mixed as in Example 1 and, after cooling to room temperature, zinc peroxide was substituted for zinc oxide. Thus, upon employing the cool 2 roll mill, 10 parts of a 50% dispersion of zinc peroxide in NBR (a copolymer of butadiene and acrylonitrile) was substituted for the zinc oxide. The dispersion of the zinc peroxide was made to mitigate the hazard of using pure zinc peroxide which is a strong oxidizer and flammable solid as developed in the background of this invention. Under the same scorch test conditions of Example 1, the Example 2 composition had a scorch safety time of 1.5 minutes at 165° C. which was adequate for most fabricating applications. This process safety was unchanged during storage at room temperature for 60 days. It thus should be understood that zinc peroxide according to this example offers process safety in comparison to zinc oxide. However, if zinc peroxide was added directly to the carboxylated nitrile rubber either on a two roll mill or in an internal mixer, there is considerable likelihood of ignition and fire. Experience has also shown that even in a predispersed form, either as a paste in a suitable plasticizer or as a dispersion in the rubber made from such a paste, unfortunately such dispersions have also ignited during their manufacture.

EXAMPLE 3

For the purpose of demonstrating the use of a polymeric hindered polyvalent metal salt of an aromatic polycarboxylic acid according to the principles of this invention, zinc terephthalate (ZnT) was substituted for the zinc oxide of Example 1 and the procedures were repeated. Upon the addition of 5 parts of ZnT, and milling according to the procedures of Example 1, the process safety was tested and, surprisingly, ZnT provided a scorch safety of about 1.7 minutes at 165° C., a value very useful in most rubber processing. ZnT gives complete (i.e., about 90%) crosslinking reaction with the carboxylated rubber in about 5-6 minutes. The rate of cure was very similar to that of zinc peroxide except that the ZnT of this invention did not have the disadvantages associated with zinc peroxide as developed above. ZnT is not an oxidizer or a flammable solid as is zinc peroxide Samples of the curable elastomer composition containing ZnT of this Example 3 were press cured for 7 minutes at 165° C. and the following physical properties were determined for comparison with zinc peroxide compositions like Example 2.

|  | Zinc Peroxide | Zinc Terephthalate |
| --- | --- | --- |
| Tensile strength (psi) | 2580 | 2565 |
| Elongation (%) | 525 | 505 |
| 300% Modulus (psi) | 1450 | 1625 |
| Hardness, Shore A | 75 | 75 |

With reference to the above comparison of physical properties, it is to be observed that the properties obtained by crosslinking with ZnT are substantially the same as those obtained by crosslinking with zinc peroxide. TGA (thermogravimetric analysis) measurements indicate that ZnT does not decompose to zinc oxide below 300° C. Therefore, controlled decomposition to zinc oxide was not involved in crosslinking according to this Example 3 illustrating this invention, as is the case with zinc peroxide. Crosslinking with the polymeric hindered zinc salts of this invention probably proceeds by salt exchange with the carboxylic acid groups of the carboxylated rubber. The behavior of the zinc terephthalate was totally unexpected upon comparison with the results of Examples 1-2 and in view of other prior art crosslinking compounds.

EXAMPLES 4 A, B and C

The procedures of Example 1 were repeated except that instead of zinc oxide, three different blends of zinc oxide (ZnO) and zinc terephthalate (ZnT) were separately used at 5 parts in the base composition i.e., 25% ZnO/75% ZnT (Example 4A); 50% ZnO/50% ZnT (Example 4B) and 75% ZnO/25% ZnT (Example 4C). The blends were prepared by carrying out the reaction of ZnO with terephthalic acid to 75%, 50% and 25% completion, respectively, to provide ZnO particles having ZnT reacted on their surfaces to various degrees of completion. Example 4A had essentially the same scorch safety of about 1.7 minutes as for ZnT in Example 3. Example 4B had a reduced scorch safety of 1.2 minutes and Example 4C had a further reduced time of 0.7-0.9 minute.

EXAMPLE 5

The procedures of Example 1 were repeated except that instead of zinc oxide, a blend of zinc oxide and terephthalic acid of 5 parts by weight basis was added in stoichiometric proportions of 1 to 1.83 of zinc oxide to terephthalic acid. This compound had a scorch safety at 165° C. of 0.8 minute, indicating that terephthalic acid is only marginally effective as a retarder for zinc oxide.

EXAMPLE 6

For the purpose of illustrating other polymeric hindered polyvalent metal salts of this invention, the procedures of Example 1 were repeated except that 5 parts of magnesium terephthalate was substituted for the zinc oxide. The composition tested had a scorch safety of 5 minutes at 165° C. and required about 30 minutes for full cure (90+% crosslinking) at that temperature. This combination of very long process safety and slow gradual cure rate is ideal for manufacture of very large parts with heavy cross-sections. In such a case, long process safety is needed to fill, for example, a large mold cavity and slow cure rate is needed so that the part can relieve stresses curing crosslinking. Another area where the characteristics of the curable composition containing magnesium terephthalate in accordance with this example are valuable is the simultaneous crosslinking and expansion of rubber sponge articles, again particularly of large dimensions. In the latter case it is desirable to synchronize the rate of crosslinking with the gradual development of a sponge structure. These advantages are considered to be very valuable over prior art crosslinking systems which heretofore have not been available for curing carboxylated nitrile rubbers.

EXAMPLES 7-23

The procedures of Example 3 for making the base composition and employing the roll mill followed by scorch testing, and full (90+%) cure, were repeated for a number of polymeric hindered polyvalent metal aromatic polycarboxylic acid salts of this invention as a substitute for zinc terephthalate. The hindered terephthalate (T) salts were used for the polyvalent metal ions of cadmium (CdT), barium (BaT), calcium (CaT), stannous (SnT), nickelous (NiT), cobaltous (CoT), cupric (CuT), ferrous (FeT), aluminum (AlT), indium (InT), cerium (CeT), chromic (CrT) and lead (PbT). Other polycarboxylic acids such as trimellitic (TM), pyromellitic (PM) and trimesic (MS) were successfully employed as a substrate for the terephthalic acid salt of zinc and are also reported in Table I as ZnTM, ZnPM and ZnMS. The results of these scorch tests and full cure (90+%) at 165° C. are reported in Table I.

TABLE I

| Example | Hindered Metal Salt | Scorch Safety (Approximate Minutes) | Full Cure (Approximate Minutes) |
| --- | --- | --- | --- |
| 7 | CdT | 2.8-3.3 | 9-10 |
| 8 | BaT | 2-3 | 8-9 |
| 9 | CaT | 1.5-1.7 | 6-6.5 |
| 10 | SnT | 4-4.5 | 20-22 |
| 11 | NiT | 4.5-5 | 25-27 |
| 12 | CoT | 4-4.5 | 18-20 |
| 13 | CuT | 4 | 16-18 |
| 14 | FeT | 4.5 | 20-22 |
| 15 | AlT | 3-3.5 | 10-12 |
| 16 | InT | 2.5-3 | 8-10 |
| 17 | CeT | 3.5 | 13-14 |
| 18 | CeT | 3.5 | 13-15 |
| 19 | CrT | 1.5-1.7 | 6-6.5 |
| 20 | PbT | 2.8-3.3 | 8-9 |
| 21 | ZnTM | 2-3 | 8-9 |
| 22 | ZnPM | 1.7 | 5-6 |
| 23 | ZnTMS | 3-3.5 | 8-9 |

A number of observations may be made with reference to Table I and the above Examples. First, the polymeric hindered polyvalent metal salts that are operative in accordance with the principles of this invention include divalent calcium, magnesium, cadmium, barium, tin, nickel, cobalt, copper, strontium, zinc and lead; and trivalent aluminum, cerium, indium, iron and chromium. Furthermore, a number of aromatic polycarboxylic acids of the hindered salts are operative including terephthalic, trimellitic, pyromellitic and trimesic. A number of other observations may be made. All of the polymeric hindered metal salts provide commercially useful rates of crosslinking and significant shelf stability with controlled or retarded onset of crosslinking so as to provide scorch safety. Various ranges of controlled cure rates are provided. For instance, with barium terephthalate, cure began in about 2 minutes and was complete in 10 minutes. This would be a useful range for curing large molded, calendered or extruded cross-sections where more rapid crosslinking provided by the zinc terephthalate was not desired. In the case of zinc trimellitate, the same rate of cure was provided as with barium terephthalate, but still in a useful range particularly for large parts. In the case of zinc pyromellitate, the rate of cure was very similar to that of zinc terephthalate of Example 3.

EXAMPLES 24 A, B, C, D, E and F

For the purpose of demonstrating the unsuitability of other polyvalent metal salts of organic acids for replacement of zinc oxide in carboxylated rubber, zinc benzoate, zinc phthalate, zinc isophthalate, zinc benzene 1,2,3-tricarboxylate, zinc acrylate and zinc maleate were separately substituted for the zinc oxide of Example 1 on a 5 parts by weight basis and the procedures of Example 1 were repeated as Examples 24 A-F, respectively. The scorch safety of each of these Examples 24 A-F were about 0.6-0.7 minute at 165° C., almost identical to that of zinc oxide. Thus, none of these zinc salts provide any improvement in process safety in comparison to zinc oxide.

The results reported in Table I and Examples 24A-F cannot be rationalized on the basis of acid strength. Trimellitic acid is stronger than terephthalic (i.e., pKa of 2.52 versus 3.82); and the zinc salt of trimilletic acid has lower reactivity (compare Example 3 with Example 21). Pyromellitic acid is stronger still (pKa of 1.92) but its zinc salt has comparable reactivity with ZnT (compare Example 3 with Example 22). On the other hand, benzoic acid (pKa 4.17) is a weaker acid; and its zinc salt is far more reactive than zinc terephthalate (compare Example 3 with Example 24A). Phthalic acid (pKa 3.00) is a stronger acid; and its zinc salt is also more reactive than zinc terephthalate (compare Example 3 with Example 24B). Therefore, the results of this invention that are achieved with the polymeric hindered polyvalent metal salts are considered unpredicted or unobvious.

It has also been observed with respect to Table I and above Examples that the crosslinking results in no way correlate with the electronegativity of the metal cation. Increasing electronegativity would give the order of barium being the most electro-positive, then calcium, magnesium, cadmium and lastly zinc. The order of reactivity of the terephthalate salts with carboxylated nitrile rubber is magnesium being least reactive, followed by barium, cadmium, calcium and zinc, as the most reactive. These factors indicate that the decomposition or dissociation of these salts is not related to the mechanism of their reaction with carboxylated nitrile rubber. This is also indicated by their decomposition temperatures being far above the 165° C. test condition.

It has been concluded that the metal ion in the polyvalent metal salts of this invention are "hindered" from reaction. For instance, calcium and zinc terephthalates are fine white powders whose properties include: (1) extreme insolubility even in such active solvents as DMF and DMSO, (2) very low electrical conductivity, comparable to electrical grade fillers, (3) exceptional heat stabilities, i.e., zinc terephthalate decomposes at 420° C., calcium terephthalate at 620° C., and (4) infrared spectra indicating equivalence of all carboxylate groups. Decomposition temperatures of divalent metal terephthalates are given in Table II as follows:

TABLE II

| Decomposition Temperatures of Terephthalate Salts | |
| --- | --- |
| Metal | Decomposition Temperature |
| Aluminum | 540° C. |
| Barium | 640° C. |
| Cadmium | 430° C. |
| Calcium | 620° C. |
| Cobalt | 475° C. |
| Magnesium | 625° C. |
| Lead | 425° C. |
| Nickel | 440° C. |
| Strontium | 630° C. |
| Zinc | 430° C. |

All determined by means of TGA (termogravimetric analysis) under nitrogen at a heating rate of 10° C./minute The terephthalates shown exhibit no melting below their decomposition temperatures. Decomposition normally proceeds cleanly to the corresponding metal oxide with volatilization of the organic fragment. Decomposition temperatures are well above the range (300°-350° C.) in which terephthalic acid sublimes. Thermal stability above the volatilization point of the organic component is not normally the case with carboxylate salts. Volume resistivities of the terephthalate salts, taken with lack of measurable solubility in water or polar solvents, suggest a very low order of ionic mobility. Symmetrical and asymmetrical carbon-oxygen infrared stretching frequencies for terephthalate salts of Table II demonstrate the presence of two strong bands of approximately equal intensity at frequencies of 1350–1400 and 1530–1600 reciprocal cm and this is consistent with equivalence of both oxygens of the carboxylate group and with coordination of both groups to the metal cation. These observations suggest that these divalent metal terephthalates exist as linear polymers of highly regular structure. Thus, they have been generally termed substantially linear polymeric hindered polyvalent metal salt(s) of aromatic polycarboxylic acids. It is difficult to rationalize the observed thermal stability and insolubility with other than a polymeric form. One structure consistent with equivalence of all oxygens is given in FIG. 1 as follows:

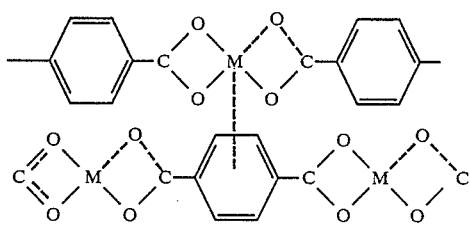

It is visualized that adjacent chains would be staggered, with the benzene rings blocking and perhaps coordinated to the metal-carboxylate linkages of the next chain. Such a structure would predict the above observations and also suggest relatively low reactivity of the metal-carboxylate groups. The times needed for complete reaction via salt exchange with an acrylonitrile-butadiene copolymer containing 10% pendant carboxylic acid groups at 165° C., resulting in crosslinking, are given in Table I for several metal terephthalates and, when compared with other metal salts, the reduction in activity is consistent with the polymeric hindered structure given in FIG. 1.

The physical properties of the cured test compositions of Table I are reported in the following Table III according to the hindered metal salt.

TABLE III

| Hindered Metal Salt | Tensile (psi) | Elongation (%) | 300% Modulus (psi) | Tear (lbs/in) | Hardness (Shore A) |
|---|---|---|---|---|---|
| MgT | 2980 | 530 | 1670 | 625 | 72 |
| CoT | 3025 | 520 | 1725 | 600 | 73 |
| SnT | 3040 | 525 | 1745 | 610 | 72 |
| NiT | 3065 | 510 | 1780 | 590 | 74 |
| CuT | 2925 | 540 | 1650 | 635 | 72 |
| FeT | 3005 | 525 | 1700 | 615 | 72 |
| BaT | 2835 | 656 | 1565 | 674 | 70 |
| CdT | 2740 | 560 | 1610 | 650 | 70 |
| CaT | 2875 | 540 | 1715 | 640 | 72 |
| SrT | 2875 | 540 | 1715 | 640 | 72 |
| PbT | 2850 | 550 | 1580 | 650 | 70 |
| ZnTM | 2825 | 550 | 1645 | 668 | 71 |
| ZnPM | 3030 | 535 | 1675 | 635 | 71 |
| ZnTMS | 2850 | 550 | 1625 | 670 | 70 |

With reference to Table III, it may be observed that physical properties achieved with the polymeric hindered metal salts of this invention in comparison to zinc peroxide, for instance, are substantially the same or better.

EXAMPLE 25

The invention may be further exemplified with use of other carboxylated polymers or elastomers. In this Example, a carboxylated ethylenepropylene (EPM) rubber designated DE-203 manufactured by Copolymer Rubber & Chemical Corp. is employed. This polymer contains 5–6% pendent carboxylic acid groups and essentially no residual unsaturation. Crosslinking is achieved by forming carboxylate salts with polyvalent metals. In the case of EPM, these crosslinks are thermally labile, therefore, the crosslink rubber can be reprocessed. The carboxylated elastomer therefor is analogous to a thermoplastic elastomer, giving properties similar to a typical thermoset elastomer at normal temperatures, but the process being reversible with heat and shear. A test compound was prepared by mixing the following ingredients in a Farrell Midget Banbury to a temperature of 120° C.: 100 parts DE-203 by weight, 150 parts ASTM grade N-762 semi-reinforcing carbon black, 75 parts Sunpar 22E paraphenic process oil and 5 parts zinc oxide. After mixing, the compounded composition was tested in a Monsanto Rheometer at 165° C. in a manner similar to that of Example 1. The initial viscosity of the composition was 6 in-lbs which rose to 10 in-lbs within 60 seconds as the zinc oxide reacted with the polymer. Viscosity was stable thereafter at that level for at least one hour and thus would be compatible with many processing steps. Upon cooling to room temperature, the sample had the resilience and resistant to deformation characteristic of a permanently thermoset EPM compound.

The above experiment was repeated with the addition of 2 parts of an organic acid, i.e., either stearic, benzoic or terephthalic acids were used. In each case, the crosslinking reaction with zinc oxide was essentially the same at 165° C.

When the above experiment was repeated using zinc terephthalate in place of zinc oxide at a 5 parts level, there was no increase in viscosity for about 4-5 minutes. After 12 minutes, the viscosity had increased from 6 to about 10 in-lbs as the reaction progressed. Therefore, consistent with the earlier Examples demonstrating the activity of the polymeric hindered polyvalent metal salts of this invention, with other carboxylated elastomers, this Example demonstrates that other carboxylated elastomers may be employed and the benefits of increased stability at lower process viscosity by controlled crosslinking may be achieved. Upon cooling the product produced by this Example, the crosslinked product appeared to be identical to the product of the first experiment.

Having described this invention and its various operating parameters, it will be understood to a person of ordinary skill in the art that other embodiments may be made without departing from the spirit and scope hereof.

What is claimed is:

1. A curable carboxylated polymer composition comprising a curable carboxylated polymer and, as a crosslinking agent, a condensation polymer of a hindered polyvalent metal salt of an aromatic polycarboxylic acid, said condensation polymer of said salt being heat stable at crosslinking temperatures of said curable composition, said aromatic polycarboxylic acid is selected from the group consisting of terephthalic, trimellitic, pyromellitic and trimesic.

2. The composition of claim 1 wherein the polyvalent metal of said salt is selected from the group consisting of calcium, magnesium, cadmium, zinc, lead, cobalt, strontium, barium, nickel, copper, tin, aluminum, cerium, indium, iron and chromium ions.

3. The composition of claim 2 wherein the aromatic polycarboxylic acid is terephthalic acid.

4. The composition of claim 1 wherein said curable carboxylated polymer is a curable elastomeric polymer.

5. The composition of claim 4 wherein said curable elastomer is a carboxylated nitrile rubber.

6. The composition of claim 5 wherein the condensation polymer is contained in an amount of from about 3 to about 10 parts per 100 parts of the curable polymer.

7. The composition of claim 6 wherein said condensation polymer is present in an amount on the order of about 5 parts per 100 parts of said curable polymer.

8. A curable carboxylated polymer composition comprising a curable carboxylated elastomer and, as a crosslinking agent, a condensation polymer of a hindered polyvalent metal salt of an aromatic polycarboxylic acid wherein the polyvalent metal is selected from the group consisting of calcium, magnesium, cadmium, zinc, lead, cobalt, strontium, barium, nickel, copper, tin, aluminum, cerium, indium, iron and chromium ions and wherein the aromatic polycarboxylic acid is selected from the group consisting of terephthalic, trimellitic, pyromellitic and trimesic.

9. The composition of claim 8 wherein said elastomer is a carboxylated nitrile rubber.

10. The composition of claim 8 wherein said aromatic polycarboxylic acid is a terephthalic acid.

11. The composition of claim 10 wherein said polyvalent metal cation is zinc.

12. The composition of claim 8 wherein said condensation polymer is contained in an amount of from about 3 to about 10 parts per 100 parts of the curable polymer.

13. The composition of claim 8 wherein a metal is selected from said group and a polycarboxylic acid is selected from said group to provide a substantially linear condensation polymer of said hindered salt.

* * * * *